United States Patent
Kaneda

(10) Patent No.: US 7,014,561 B2
(45) Date of Patent: Mar. 21, 2006

(54) RECORDING MEDIUM FOR STORING GAUGE DISPLAY PROGRAM, GAUGE DISPLAY METHOD VIDEO GAME DEVICE, AND GAUGE DISPLAY PROGRAM

(75) Inventor: Motoki Kaneda, Osaka (JP)

(73) Assignee: Konami Corporation, Tokyo (JP)

( * ) Notice: Subject to any disclaimer, the term of this patent is extended or adjusted under 35 U.S.C. 154(b) by 345 days.

(21) Appl. No.: 10/134,819

(22) Filed: Apr. 26, 2002

(65) Prior Publication Data

US 2002/0173350 A1   Nov. 21, 2002

(30) Foreign Application Priority Data

May 16, 2001   (JP) ............................. 2001-147130

(51) Int. Cl.
*A63F 13/00* (2006.01)
(52) U.S. Cl. ...................................... 463/31
(58) Field of Classification Search ............ 463/1, 463/4, 8, 30, 31, 43
See application file for complete search history.

(56) References Cited

U.S. PATENT DOCUMENTS

| | | | |
|---|---|---|---|
| 5,435,554 A | | 7/1995 | Lipson |
| 6,273,822 B1 * | | 8/2001 | Tanaka .................... 463/43 |
| 6,394,896 B1 * | | 5/2002 | Sugimoto .................. 463/3 |
| 6,488,586 B1 * | | 12/2002 | Kobayashi et al. ........... 463/43 |

FOREIGN PATENT DOCUMENTS

| | | |
|---|---|---|
| EP | 0 911 069 | 4/1999 |
| EP | 0 945 156 | 9/1999 |
| JP | 7-155463 | 6/1995 |
| JP | 10-277268 | 10/1998 |
| JP | 11-179057 | 7/1999 |
| JP | 2000-070545 | 3/2000 |
| JP | 2000-296268 | 10/2000 |

OTHER PUBLICATIONS

Jagged Alliance 2 Manual © 1999 Sir-tech Canada Ltd pp. 14,15,18,19,20,21 encl.*

* cited by examiner

*Primary Examiner*—Xuan M. Thai
*Assistant Examiner*—Robert Mosser
(74) *Attorney, Agent, or Firm*—Jordan & Hamburg LLP

(57) ABSTRACT

A gauge display program is provided which makes it possible for a user to ascertain easily parameter values, and which enables the image of the game itself to be satisfactorily displayed and thereby to enable the interest of the video game itself to be satisfactorily presented to the user. Image data is output to television monitor 21 so that an action-responsive gauge displayed on a game screen is successively switched over, by means of a gauge display switching section 109, to an action-responsive gauge selected as the result of a determination by a gauge display type determination section 102 and action determination section 103, and thus the action-responsive gauge displayed on the game screen is switched over in response to the action of the game character.

9 Claims, 8 Drawing Sheets

RECORDING MEDIUM FOR STORING GAUGE DISPLAY PROGRAM, GAUGE DISPLAY METHOD VIDEO GAME DEVICE, AND GAUGE DISPLAY PROGRAM

BACKGROUND OF THE INVENTION

1. Field of the Invention

The present invention relates to a video game device that displays on a game screen a gauge for representing the values of parameters relating to the game characters used in the game, a recording medium which stores a gauge display program, a gauge display program and a gauge method employed in this video game device.

2. Description of the Related Art

Video game devices are previously known in which a game can be played by operating game characters by a user who wishes to enjoy the video game in game space using a video game device. In such games, various parameters relating to the game characters are employed in order to improve the interest of the game by diversifying the progress of the game.

Typically, these parameters are displayed on the game screen using a gauge on which the parameter values are represented, the parameter values being displayed by numerical values or a gauge bar of length corresponding to a numerical value. The user can enjoy the video game by operating the characters while ascertaining the parameter values, by using the gauge displayed on a suitable game screen, in fixed manner or in response to user operation so as to perform operation in accordance with the parameter values.

However, in video games whose theme is a sport such as ice hockey or soccer, it is necessary to operate the game characters rapidly, so the operating condition of the game characters changes in a short space of time and the parameters which the user wishes to ascertain also change successively due to this change of operating condition. Consequently, the user must rapidly switch the gauge that is displayed in accordance with the operating condition of the game character and must use the displayed gauge to confirm the parameter values. Such operation imposes an excessive load on the user as a result of which the user becomes overburdened by this operation and cannot appreciate the interest of the video game itself.

Also, consideration may be given to displaying a plurality of gauges which the user wishes to check in fixed manner on the game screen in order to avoid the switching operation described above. However, since the size of the game display screen such as a television monitor is restricted and in the case of a video game whose theme is a sport such as ice hockey or soccer there are a large number of game characters etc to be displayed on the game screen, if a plurality of gauges are simultaneously displayed on the game screen, a large part of the game screen is occupied by the gauge, with the result that the image of the sports game itself cannot be properly displayed, thereby impairing the interest of the video game itself.

Accordingly, an object of the present invention is to make it possible for a user to ascertain easily parameter values relating to game characters; also, an object is to provide a gauge display program, gauge display method and video game device capable of satisfactorily displaying the image of the game itself and of satisfactorily presenting the interest of the video game itself to the user.

SUMMARY OF THE INVENTION

In order to achieve the above object, according to the present invention, a recording medium which stores a gauge display program for displaying a gauge representing a value of a parameter relating to a game character on a game screen, comprising the steps of: causing a video game device to select a gauge to be displayed on the game screen from a plurality of gauges that represents the values of a plurality of mutually different parameters, in accordance with the state of progress of the game; and causing the video game device to switch a display of the gauge displayed on the game screen to the gauge selected in said selection step.

With the present invention, a gauge display program stored in the recording medium, for displaying a gauge representing the value of a parameter relating to a game character on a game screen causes the video game device to function as selection means that selects from a plurality of gauges that display the values of a plurality of mutually different parameters a gauge to be displayed on a game screen in accordance with the state of progress of the game and display switching means that successively switches the gauge displayed on the game screen to the gauge selected by the selection means. That is, in the video game, the gauge to be displayed on the game screen is selected from a plurality of gauges in accordance with the state of progress of the game and the gauge that is displayed is successively switched over to the selected gauge. Consequently, since the gauge is automatically altered in accordance with the state of progress of the game, the user can easily ascertain the values of parameters relating to the game character in accordance with the state of progress of the game without performing the troublesome operation of changing over gauge in response to the state of progress of the game.

Also, since the gauge to be displayed on the game screen is selected from a plurality of gauges and display is effected on the game screen with the selected gauge successively switched over, compared with the case where a plurality of gauges are all simultaneously displayed on the game screen, the region of the game screen occupied for displaying gauges can be reduced. Consequently, the image of the game itself can be satisfactorily displayed on the game screen.

These and other objects, features, and advantages of the present invention will become more apparent upon reading the following detailed description along with the accompanying drawings.

DESCRIPTION OF THE PREFERRED EMBODIMENTS

Figure 1:
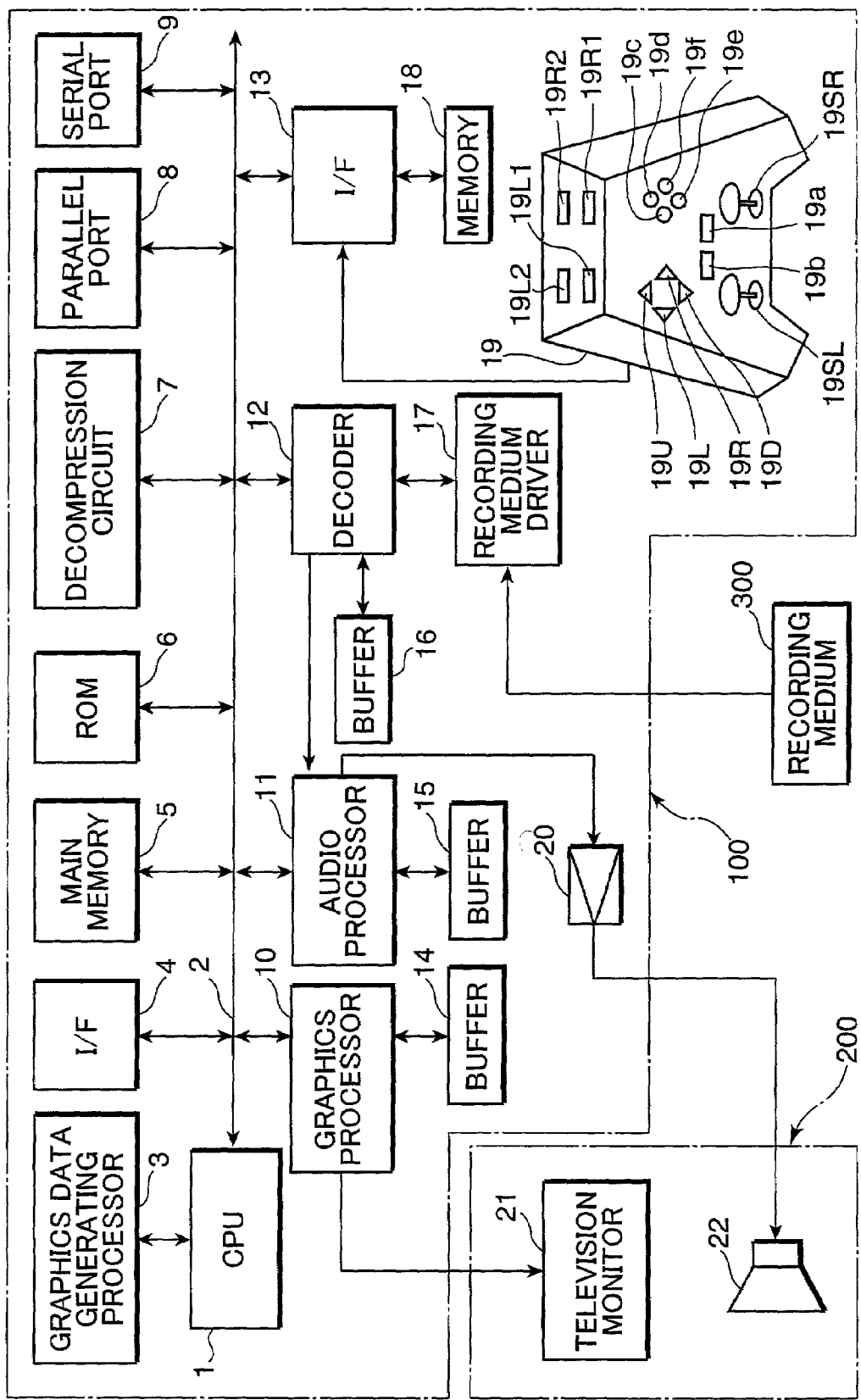
FIG. 1 is a block diagram illustrating the construction of a video game device according to an embodiment of the present invention.

A video game device according to an embodiment of the present invention is described below with reference to the drawings. FIG. 1 is a block diagram illustrating the construction of a video game device according to an embodiment of the present invention. Although, as an example of a video game device, the following description is given for the case of a domestic video game device constituted by connecting a domestic video game machine to a domestic television, the present invention is not particularly restricted to this example and could be applied in the same way to a commercial video game device integrally constructed with a monitor or to a personal computer or the like functioning as a video game device by running a video game program.

The video game device shown in FIG. 1 comprises a domestic game machine 100 and a domestic television 200. A recording medium 300 capable of being read by a computer and on which program data is recorded is inserted into the domestic game machine 100.

Domestic game machine 100 comprises a CPU (Central Processing Unit) 1, bus line 2, graphics data generating processor 3, interface circuit (I/F) 4, main memory 5, ROM (read-only memory) 6, decompression circuit 7, parallel port 8, serial port 9, graphics processor 10, audio processor 11, decoder 12, interface circuit 13, buffers 14 to 16, recording medium driver 17, memory 18, controller 19 and amplification circuit 20. Domestic television 200 comprises a television monitor 21 and speakers 22.

CPU 1 is connected with bus line 2 and graphics data generating processor 3. Bus line 2 includes an address bus, data bus and control bus etc and mutually connects CPU 1, interface circuit 4, main memory 5, ROM 6, decompression circuit 7, parallel port 8, serial port 9, graphics processor 10, audio processor 11, decoder 12 and interface circuit 13.

Graphics processor 10 is connected with buffer 14. Audio processor 11 is connected with buffer 15 and amplification circuit 20. Decoder 12 is connected with buffer 16 and recording medium driver 17. Interface circuit 13 is connected with memory 18 and controller 19.

The television monitor 21 of the domestic television 200 is connected with graphics processor 10. Speaker 22 is connected with amplification circuit 20. In the case of a commercial video game device, the television monitor 21 and speakers 22 may be accommodated in a single box together with the various blocks that constitute a domestic game machine 100.

Also, when a video game device is constituted with a personal computer or workstation etc as its nucleus, television monitor 21 etc corresponds to a computer display. Also, decompression circuit 7, graphics processor 10 and audio processor 11 etc respectively correspond to part of the program data recorded on recording medium 300 or to hardware on an expansion board mounted in an expansion slot of the computer. Also, interface circuit 4, parallel port 8, serial port 9 and interface circuit 13 correspond to hardware on an expansion board mounted in an expansion slot of the computer. Also, buffers 14 to 16 respectively correspond to storage areas of main memory 5 or expansion memory (not shown).

Next, the structural elements shown in FIG. 1 will be described. Graphics data generating processor 3 plays the role of what is known as a co-processor of CPU 1. Specifically, graphics data generating processor 3 performs co-ordinate conversion or light source calculation such as for example matrix or vector calculation of fixed decimal point form by parallel processing.

The chief processing performed by graphics data generating processor 3 comprises processing to find the address data of an image that is being processed on a prescribed area by using the co-ordinate data of each vertex in two-dimensional or three-dimensional space of the image data supplied from CPU 1, data of the amount of movement and data of the amount of rotation etc and to return this to CPU 1 and also processing to calculate image brightness in accordance with distance from a light source that has been set up virtually.

Interface circuit 4 is employed for interfacing with peripheral devices such as for example pointing devices such as a mouse or tracker ball. Main memory 5 is constituted of RAM (random access memory) etc. In ROM 6 there are stored program data constituting the operating system etc of the video game device. This program corresponds to the BIOS (Basic Input Output System) of a personal computer.

Decompression circuit performs decompression processing on the compressed image compressed by intracoding in accordance with the MPEG (Moving Picture Engineering Group) standard for video or the JPEG (Joint Picture Engineering Group) standard for Static Pictures. Decompression processing includes decoding processing (decoding of data encoded by VLC: Variable Length Code), inverse quantization processing, IDCT (Inverse Discreet Cosine Transform) processing and restoration processing of intra-images etc.

Graphics processor 10 performs graphics processing in respect of buffer 14 under the control of graphics instructions issued by CPU 1 at intervals of a prescribed time T (for example in one frame T=1/60 sec.).

Buffer 14 is constructed of for example RAM and is divided into a display area (frame buffer) and non-display area. The display area consists of the deployment area of the data displayed on the display screen of television monitor 21. The non-display area consists of storage areas for example in this embodiment data defining skeletons, model data defining polygons, animation data for performing model movement, pattern data indicating the content of animation, texture data and color palette data etc.

The texture data consists of two-dimensional graphics data. The color palette data consists of data for designating the color of the texture data etc. These data from recording medium 300 are stored beforehand by CPU 1 in the non-display area of buffer 14 either on a single occasion or on a plurality of occasions in accordance with the state of progress of the game.

The graphics instructions comprise graphics instructions for drawing three-dimensional images using polygons and graphics instructions for drawing ordinary two-dimensional images. "Polygons" are two-dimensional virtual figures of polygonal shape; in this embodiment, triangles are employed.

The graphics instructions for drawing three-dimensional images using polygons are carried out respectively in respect of polygon vertex address data indicating the storage position on the display area of buffer 14 of the polygon vertex co-ordinate data, texture address data indicating the storage position on buffer 14 of texture data pasted onto the polygon, color palette address data indicating the storage position on buffer 14 of color palette data indicating the color of the texture and brightness data indicating the brightness of the texture.

Of the above data, the polygon vertex address data on the display area is substituted in the polygon vertex co-ordinate data in two dimensions by the graphics data generating processor 3 performing co-ordinate conversion on the polygon vertex co-ordinate data in three-dimensional space from CPU 1, using the amount of movement data and amount of rotation data on the screen itself. The brightness data is determined by graphics data generating processor 3 in accordance with the distance from the virtually arranged light source from the position indicated by the polygon vertex co-ordinate data after the above co-ordinate substitution from CPU 1.

The polygon vertex address data indicates the address on the display area of buffer 14. Graphics processor 10 performs processing to write texture data corresponding to the range of the display area of buffer 14 indicated by three polygon vertex address data.

An object such as a character in game space is constituted by a plurality of polygons. CPU 1 associates the co-ordinate data in three-dimensional space of each of the polygons with the corresponding skeleton vector data before storing these in buffer 14. If movement of the character is represented or the position of the viewpoint from which the character is viewed changes when the character moves etc on the display screen of television monitor 21 by operation of controller 19, to be described, the following processing is performed.

Specifically, CPU 1 supplies to graphics data generating processor 3 the movement amount data and rotation amount data of each polygon found from the three-dimensional co-ordinate data of the vertices of the polygons held in the non-display area of buffer 14 and data of the skeleton co-ordinates and the amount of rotation thereof.

Graphics data generating processor 3 uses the three-dimensional co-ordinate data of the vertices of each polygon and the amount of movement data and the amount of rotation data of each polygon to successively find the three-dimensional co-ordinate data after movement and after rotation of each polygon.

Of the three-dimensional co-ordinate data of each polygon that are thus found, the co-ordinate data in the horizontal and vertical direction are supplied to graphics processor 10 as address data on the display area of buffer 14 i.e. as polygon vertex address data.

Graphics processor 10 writes the texture data indicated by the texture address data allocated beforehand on the triangle display area of buffer 14 indicated by the three polygon vertex address data. In this way, an object having texture data pasted onto a large number of polygons is displayed on the display screen of television monitor 21.

The graphics instructions for drawing an ordinary two-dimensional image are carried out on the color palette address data indicating storage position on buffer 14 of the vertex address data, texture address data and color palette data indicating the color of the texture data, and also on the brightness data indicating the brightness of the texture. Of these data, the vertex address data are co-ordinate data obtained by graphics data generating processor 3 by co-ordinate conversion of the vertex co-ordinate data on the two-dimensional plane from CPU 1 using the movement amount data and rotation amount data from CPU 1.

Audio processor 11 stores the ADPCM (Adaptive Differential Pulse Code Modulation) data read from recording medium 300 in buffer 15 and this ADPCM data stored in buffer 15 provides a sound source.

Also, using for example a clock signal of frequency of 44.1 kHz, audio processor 11 reads the ADPCM data from buffer 15. Audio processor 11 performs processing such as conversion of pitch in respect of the ADPCM data that has been read, addition of noise, setting of envelope, setting of level and addition of verve.

If the audio data that is read from recording medium 300 is PCM data such as CD-DA (Compact Disk Digital Audio), this is converted to ADPCM data by audio processor 11. Also, processing of the PCM data by the program is directly performed on main memory 5. After the PCM data that has been processed on main memory 5 has been supplied to audio processor 11 where it is converted to ADPCM, the various processes described above are performed and audio is then output from speaker 22.

As the recording medium driver 17, there may be employed for example a DVD-ROM drive, CD-ROM drive, hard disk drive, optical disc drive, flexible disc drive, silicon disk drive, or cassette medium reader. In this case, recording medium 300 may be a DVD-ROM, CD-ROM, hard disk, optical disc, flexible disk, or semiconductor memory etc.

Recording medium driver 17 reads image data, audio data and program data from recording medium 300 and supplies this data which is read to decoder 12. Decoder 12 performs error correction processing on the reproduced data from recording medium driver 17 using ECC (Error Correction Code) and supplies the data which has thus been subjected to error correction processing to main memory 5 or audio processor 11.

As memory 18 there may be employed for example memory of the holder or card type. The card type memory is employed for holding various types of game parameters at the time-point of disconnection such as for example holding the condition at the time-point of disconnection in the event that such disconnection occurs during progress of the game.

Controller 19 is a control device for inputting various types of control instructions by the user so that a control signal corresponding to the user input is sent to CPU 1. On controller 19 there are provided first left button 19L1, second left button 19L2, first right button 19R1, second right button 19R2, upwards direction key 19U, downwards direction key 19D, leftwards direction key 19L, rightwards direction key 19R, start button 19*a*, select button 19*b*, first button 19*c*, second button 19*d*, third button 19*e*, fourth button 19*f*, left stick 19SL and right stick 19SR.

Upwards direction key 19U, downwards direction key 19D, leftwards direction key 19L and rightwards direction key 19R are employed for example to supply to CPU 1 commands for moving a character or the cursor in the vertical or horizontal directions on the screen of television monitor 21.

Start button 19*a* is employed for instructing CPU 1 to load the game program from recording medium 300. Select button 19*b* is employed for instructing CPU 1 of various types of selection in regard to the game program that is loaded into main memory 5 from recording medium 300.

With the exception of left stick 19SL and right stick 19SR, the buttons and keys of controller 19 are constituted of ON/OFF switches that become ON when pressed from an intermediate position by pressing force from outside and that become OFF by returning to the intermediate position when the pressure is released.

Left stick 19SL and right stick 19SR are stick type controllers of practically the same construction as a so-called joystick. Specifically, they comprise an erect stick of a construction such as to be tiltable in 360° directions including forwards/backwards and left/right about a prescribed position of this stick. Left stick 19SL and right stick 19SR send the values of the x co-ordinate of the left/right direction and the y co-ordinate of the forwards/backwards direction, the upright position constituting the point of origin, to CPU 1 as control signals through interface circuit 13, in response to the stick tilting direction and tilting angle.

The first left button 19L1, second left button 19L2, first right button 19R1 and second right button 19R2 are employed for various functions in accordance with the game program that is loaded from recording medium 300.

Next, the general operation of the above video game device will be described. If a recording medium 300 is inserted in recording medium driver 17, when the power source of the video game device is turned on by turning on the power switch (not shown), CPU 1, in accordance with the operating system stored in ROM 6, instructs recording medium driver 17 to read the game program from recording medium 300. In response to this, recording medium driver 17 reads the image data, audio data and program data from recording medium 300. The image data, audio data and program data that have thus been read are supplied to decoder 12 and decoder 12 performs error correction processing on the respective data.

The image data on which error correction processing has been performed by decoder 12 are supplied to decompression circuit 7 through bus line 2. The image data that has been subjected to decompression processing as described above by decompression circuit 7 is supplied to graphics processor 10 and graphics processor 10 writes this to the non-display area of buffer 14. The voice data that has been subjected to error correction processing by decoder 12 is written to buffer 15 through main memory 5 or audio processor 11. The program data that has been subjected to error correction processing by decoder 12 is written to main memory 5.

After this, CPU 1 runs the video game in accordance with the game program stored in main memory 5 and the content designated by the user using controller 19. That is, CPU 1 suitably performs control of image processing, control of audio processing and control of content processing using the content designated by the user using controller 19.

The control of image processing that is performed consists in, for example, calculation of the co-ordinates of the skeletons from the pattern data corresponding to the animation designated for the character and calculation of the vertex co-ordinate data of the polygons, supplied to graphics data generating processor 3, of the three-dimensional co-ordinate data and/or viewpoint position data which are thereby obtained and issue of graphics instructions including address data on the display area of buffer 14 and/or brightness data requested by graphics data generating processor 3.

The control of audio processing that is performed consists in for example of issue of audio output commands or instructions such as level or reverberation to audio processor 11. The control of content processing that is performed consists in for example of calculation in response to operation of controller 19.

Next, the case where an ice hockey game is performed using a video game device constructed as described above will be described. This ice hockey game is a competitive game in which an ice hockey match is played between the user's own team consisting of a plurality of characters (ice hockey players) capable of being controlled by the user and an opposing team consisting of a plurality of opposing characters (ice hockey players) capable of being controlled by another user or the computer.

In this ice hockey game, according to this embodiment, a plurality of action-responsive gauges constituting gauges displaying the parameter values relating to the game characters and corresponding to actions and representing the values of parameters corresponding to actions associated with character actions employed in the game space are displayed in respect of the characters controlled by the user and are also displayed in respect of the characters controlled by another user or the computer constituting the opponent.

It should be noted that, apart from the ice hockey players which are the above characters, the game characters in this embodiment include objects such as the puck.

Figure 2:
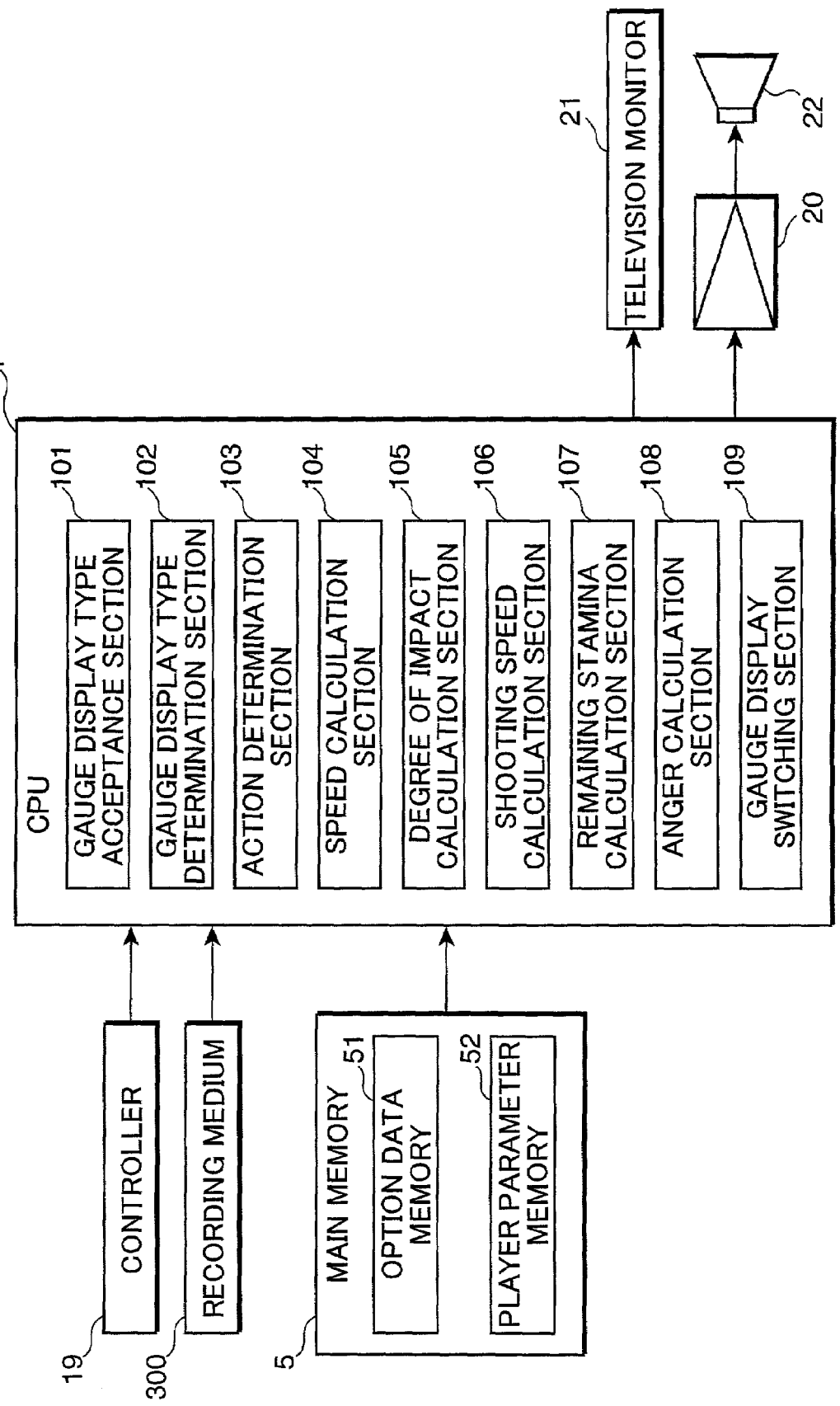
FIG. 2 is a block diagram illustrating the functional layout of a CPU focusing on the operation of the video game device illustrated in FIG. 1.
Figure 3A:
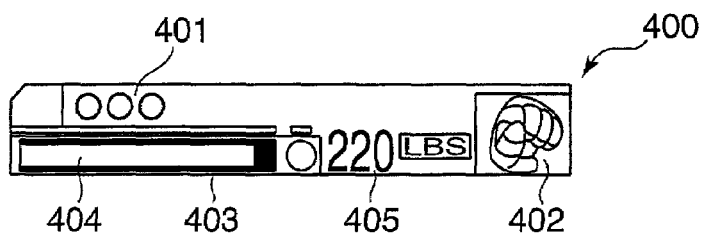
FIG. 3 is a view illustrating an example of an action-responsive gauge of player display type A employed in the video game device of FIG. 2.
Figure 3B:
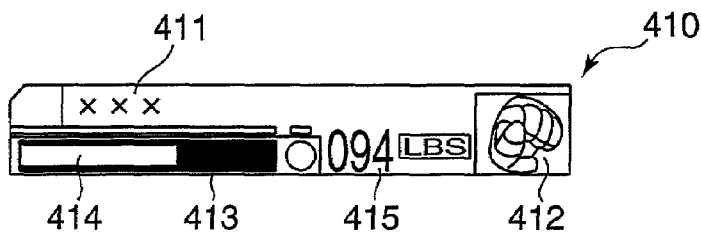
Figure 3C:
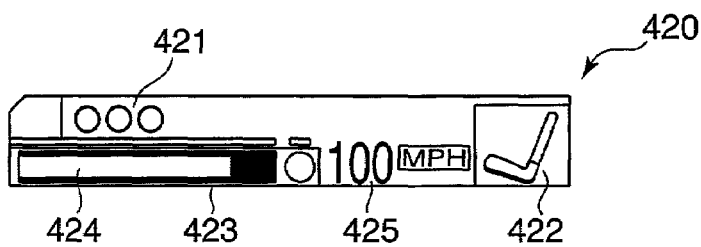
Figure 3D:
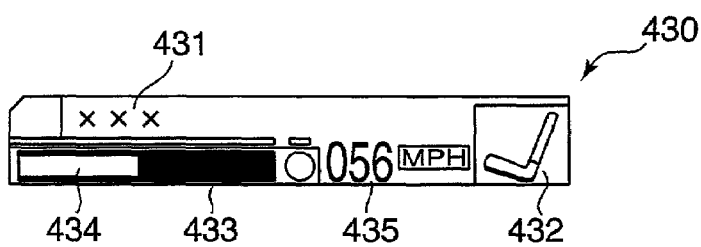
Figure 3E:
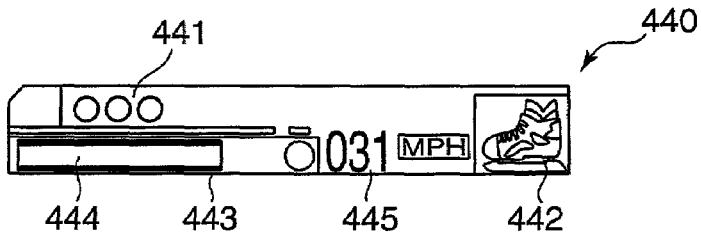
Figure 3F:
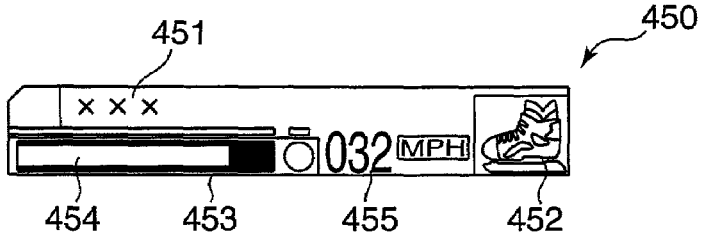

FIG. 2 is a block diagram illustrating the functional layout of CPU 1 with particular reference to the action of the video game device illustrated in FIG. 1. In FIG. 2, to facilitate description, illustration of the interface circuit and bus etc is omitted and, as the structural elements other than CPU 1, only main memory 5, television monitor 21, speakers 22, controller 19 and recording medium 300 are shown.

Main memory 5 functions as option data memory 51 and player parameter memory 52. Option data memory 51 stores as option data set by the user using the option screen settings of the buttons of controller 19 and/or settings of various types etc relating to characters in game space. For example, option data memory 51 stores the gauge display type etc, which is set by the user.

Player parameter memory 52 stores for each character various player parameters etc relating to these characters. For example, player parameter memory 52 stores in the form of numerical values the speed/acceleration parameter, which is a player parameter relating to the skating ability of the character, the stamina parameter, which is a player parameter relating to character stamina, the shooting force parameter, which is a player parameter relating to the speed of shooting of the character, the physical parameter, which is a player parameter relating to the player strength in checking other characters and the ferocity parameter, which is a player parameter relating to the degree of anger of the character.

Recording medium 300 stores the ice hockey game program in a condition which is capable of being read by a computer; this ice hockey game program includes a gauge display program for executing gauge display processing, to be described.

By reading and executing the gauge display program stored on recording medium 300, CPU 1 functions as a gauge display type acceptance section 101, gauge display type determination section 102, action determination section 103, speed calculation section 104, degree of impact calculation section 105, shooting speed calculation section 106, remaining stamina calculation section 107, degree of anger calculation section 108 and gauge display switching section 109.

Before starting the ice hockey game, the gauge display type acceptance section 101 accepts the gauge display type selected by the user by input from controller 19 using a prescribed option screen, from a plurality of gauge display types. The gauge display type acceptance section 101 stores the accepted gauge display type in the option data memory 51 as option data.

Regarding the respective gauge display types, different combinations of action-responsive gauges corresponding to actions can be displayed; in this embodiment, there are prepared beforehand three types of gauge display, for example, player display type A, player display type B and player display type C.

When player display type A is set as the gauge display type, the action-responsive gauge representing skating speed of the character, which is the action-responsive parameter corresponding to the action during skating by the character is displayed; the action-responsive gauge representing degree of impact, which is the parameter corresponding to the action during checking (condition in which the characters bump into each other) by a character is displayed; after shooting by a character, the action-responsive gauge representing shooting speed, which is the parameter corresponding to the action is displayed.

Also, when player display type B is set as the gauge display type, the action-responsive gauge representing the remaining stamina, which is the parameter corresponding to the action during skating by the character is displayed; during checking by the character, the action-responsive gauge representing the degree of impact is displayed; and after shooting by the character, the action-responsive gauge representing shooting speed is displayed.

Also, when player display type C is set as the gauge display type, the action-responsive gauge representing degree of anger, which is the parameter corresponding to action during skating by the character, is displayed; during checking by the character, the action-responsive gauge expressing degree of impact is displayed; and after shooting by the character the action-responsive gauge representing shooting speed that is the action-responsive parameter is displayed.

It should be noted that, regarding gauge display type, there is no particular restriction to the examples described above and other combinations with regard to the gauge display type could be employed or gauge display types of two or four or more types could be employed.

Gauge display type determination section 102 determines to what player display type the gauge display type of the characters is to be set by gauge display type acceptance section 101, by referring to the player display type of the characters stored in option data memory 51.

Action determination section 103 determines the current action of the character as the state of progress of the game; in this embodiment, it determines for example the current action condition of the character from among the three actions: skating, checking and after shooting.

It should be noted that the character actions determined as the state of progress of the game are not particularly restricted to the above example and other character actions could be employed. Also, as the state of progress of the game, there is no particular restriction to character actions and other events etc could be employed, so long as they are generated as events etc indicating the state of progress of the game.

When it is determined by gauge display type determination section 102 that the gauge display type of the character is player display type A and when it is determined by action determination section 103 that the current action of the character is skating, speed calculation section 104 calculates the skating speed of the character during skating.

For example, speed calculation section 104 decreases the speed vector in accordance with the speed/acceleration parameter by substituting the input value for the character obtained by operation of controller 19 by the user etc in the speed vector as a movement input vector. Thereupon, the speed calculation section 104, if the skating motion data is data indicating a dash straight forward, performs processing to increase the speed vector. This skating data comprises for example data indicating ordinary progress in the forwards direction, data indicating a dash forwards, data indicating a turn to the right and data indicating a turn to the left etc. Next, speed calculation section 104 reduces the speed vector by the degree of friction between the skating shoes of the character and the ice surface. In this embodiment, the frame rate (number of frames per second) is 60, so speed calculation section 104 converts the speed vector to speed per second by multiplying by 60 and further converts this to speed per hour, thereby calculating the skating speed of the character in terms of speed per hour.

If action determination section 103 determines that the current action of the character is checking, impact calculation section 105 calculates the degree of impact of the character resulting from checking. For example, taking the value of the physical parameter as the base value, impact calculation section 105 increases or decreases this base value in response to checking motion data corresponding to the current action. This checking motion data may include for example data indicating shoulder charging, data indicating elbowing, and data indicating slashing (hitting the opponent with the stick). In addition, speed calculation section 104 calculates the degree of impact by multiplying this base value by the speed vector.

If action determination section 103 determines that the current action of the character is "after shooting", shooting speed calculation section 106 calculates the speed of the puck shot by the character and takes this as the shooting speed. For example, shooting speed calculation section 106 finds a base vector by combining the speed vector of the character who has made the shot with the shooting force parameter and reduces this base vector by an amount corresponding to the degree of friction between the puck and the ice surface. The frame rate is 60, so shooting speed calculation section 106 converts the base vector to speed per second by multiplying by 60 and further converts this to speed per hour, thereby calculating the puck speed in terms of speed per hour.

If gauge display type determination section 102 determines that the character gauge display type is player display type B and action determination section 103 determines that the current character action is skating, remaining stamina calculating section 107 calculates the remaining stamina of the character during skating. For example, remaining stamina calculating section 107 calculates the remaining stamina by subtracting from the initial value (limit value) of the stamina parameter prescribed values associated with each of skating motion data and checking motion data of the character such as damage sustained during dashing.

If gauge display type determination section 102 determines that the character gauge display type is player display type C and action determination section 103 determines that the current action of the character is skating, anger calculation section 108 calculates the state of anger of the character during skating. For example, anger calculation section 108 takes the initial value of the state of anger as 0 and, when a player is checked, if the player's own team has lost points etc, calculates the state of anger in the form of a numerical value by adding a prescribed value associated beforehand with such cases to the ferocity parameter.

Gauge display switching section 109 outputs to television monitor 21 image data for displaying an action-responsive gauge displayed on the game screen in a manner in which successive switching is effected to the action-responsive gauge selected as a result of the determination carried out by gauge display type determination section 102 and action determination section 103. At this point, gauge display switching section 109 outputs to the television monitor 21 image data for displaying a gauge bar etc of length corresponding to the numerical value calculated by one other of the calculation sections 104 to 108 in the action-responsive gauge that is displayed. Using the above image data, television monitor 21 switches over the action-responsive gauge that is displayed on the game screen in accordance with the action of the character.

In this embodiment, the gauge display type determination section 102 and action determination section 103 correspond to the selection means, gauge display switching section 109 corresponds to the display switching means and gauge display type acceptance section 101 corresponds to the acceptance means.

FIG. 3 is a view illustrating an example of an action-responsive gauge of player display type A employed in the video game device shown in FIG. 2. FIGS. 3A and 3B show action-responsive gauges 400, 410 displayed during checking; FIGS. 3C and 3D show action-responsive gauges 420, 430 displayed after shooting, and FIGS. 3E and 3F display action-responsive gauges 440, 450 displayed during skating.

Action-responsive gauges 400, 410 include character names 401, 411, icons 402, 412, main gauges 403, 413 and numerical value displays 405, 415.

"OOO" and "XXX" of the character's names 401, 411 indicate the names of the characters operated by the user etc. As icons 402, 412, for example the design of a globe is employed as a design corresponding to the degree of impact on the character produced by checking, in order to indicate the fact that the degree of impact produced by checking on the character is displayed by action-responsive gauges 400, 410.

In main gauges 403, 413, the impact of checking on a character is displayed by the length of gauge bars 404, 414. Numerical value displays 405, 415 display the above degree of impact as numerical value displays and LBS (pounds) is also concurrently displayed as the units of the degree of impact.

The limit values of degree of impact are displayed by the lengths of main gauges 403, 413 (maximum length of gauge bars 404, 414 that can be displayed) and are the same for all the characters; gauge bars 403, 413 are displayed with length corresponding to degree of impact within the range of this limit value.

Action-responsive gauges 420, 430 include character names 421, 431, icons 422, 432, main gauges 423, 433 and numerical value displays 425, 435.

The names of the characters that are being operated by the user etc are displayed as "OOO" and "XXX" of character names 421, 431. As icons 422, 433, a design corresponding to the speed of the puck after shooting, for example the design of a stick, is employed in order to indicate the fact that the speed of the puck after shooting is being displayed on the action-responsive gauges 420, 430.

Main gauges 423, 433 indicate the speed of the puck after shooting by the length of gauge bars 424, 434. In the numerical value displays 425, 435, the speed of the puck mentioned above is expressed by a numerical value display in combination with "MPH" (miles per hour) as the speed units.

The limit values of puck speed are expressed by the lengths of main gauges 423, 433 (maximum length of gauge bars 424, 434 that can be displayed) and are the same for all characters; within the range of these limit values, gauge bars 424, 434 are displayed with length corresponding to the puck speed.

Action-responsive gauges 440, 450 include character names 441, 451, icons 442, 452, main gauges 443, 453 and numerical value displays 445, 455. "OOO" and "XXX" of the character names 441, 451 indicate the names of the characters operated by the user etc. As icons 442, 452, for example a design of skating shoes is employed as a design corresponding to the speed of skating of a character during skating, in order to represent the fact that the skating speed of a character during skating is being displayed by action-responsive gauges 440, 450.

Main gauges 443, 453 express the speed of skating of a character during skating by means of the length of gauge bars 444, 454. In numerical value displays 445, 455, the above skating speed is expressed by means of a numerical value display in combination with "MPH" (miles per hour) as the speed units.

The limit values of skating speed are displayed by the lengths of main gauges 443, 453 (maximum length of gauge bars 444, 454 that can be displayed); gauge bars 444, 454 are displayed with length corresponding to skating speed within the range of this limit value. It should be noted that the limit values of skating speed are different for each character as shown in E and F of FIG. 3, being set to be longer for larger values of the player parameter relating to skating ability of the character.

Also, when for example the action-responsive gauge 440 indicates the condition after commencement of the game, gauge bar 444 has reached the right hand end (limit value) of main gauge 443. As the game proceeds, the value of the player parameter relating to character stamina falls, so the length of gauge bar 444 becomes shorter and so cannot exceed the prescribed length. Consequently, the user can ascertain the fact that a character's stamina corresponding to action-responsive gauge 440 has dropped by checking the length of gauge bar 444 and can ascertain the other parameters by checking the mutually related parameters in game space.

Also, in the case of player display type B, of the action-responsive gauges of player display type A, instead of action-responsive gauges 440, 450 representing the skating speed of the character, an action-responsive gauge expressing the remaining stamina of the character is displayed; the other action-responsive gauges are the same as the action-responsive gauges of player display type A.

The action-responsive gauge expressing remaining stamina as referred to above is essentially the same in constitution as the action-responsive gauges 440, 450, but differs in the following respect. That is, a design indicating the remaining stamina of the character is represented as an icon; the value of the remaining stamina of the character is represented by the length of the gauge bar; and the numerical value of the remaining stamina of the character is represented in units (%) by a numerical value display.

The limit value of the remaining stamina of the character is expressed by the length of the main gauge (maximum length of the gauge bar that can be represented); the gauge bar is displayed with a length within the range of this limit value corresponding to the remaining stamina of the character. The limit values of remaining stamina of the characters are different for each character and are set so as to become longer for larger values of the stamina parameter.

Since, as described above, the limit values of the character's skating speed and remaining stamina are different depending on the character, some characters have large limit values of skating speed and remaining stamina while others have small values thereof, depending on the character employed by the user. In this way, progress of the ice hockey game can be diversified in accordance with these differences of limit values of skating speed and remaining stamina, so the interest of the ice hockey game can be further improved. It should be noted that the parameters whose limit values are different depending on the character are not particularly restricted to the example described above and the limit values of other parameters could be set so as to be different depending on the character.

Also, in the case of player display type C, of the action-responsive gauges of player display type A, instead of action-responsive gauges 440, 450 representing the skating speed of the character, an action-responsive gauge expressing the state of anger of the character is displayed; the other action-responsive gauges are the same as the action-responsive gauges of player display type A.

The action-responsive gauge expressing character anger as referred to above is essentially the same in constitution as the action-responsive gauges 440, 450, but differs in the following respect. That is, a design indicating the state of anger of the character is represented as an icon; the value of the state of anger of the character is represented by the length of the gauge bar; and the numerical value of the state of anger of the character is represented in units (%) by a numerical value display.

The limit value of the state of anger of the character is expressed by the length of the main gauge (maximum length of the gauge bar that can be represented) and is the same for all the characters; the gauge bar is displayed with a length within the range of this limit value corresponding to the state of anger of the character.

Also, the set-up is such that characters that have a high numerical value of the state of anger check the opposing characters more strongly, delivering a higher degree of impact to the opposing characters. The user can therefore ascertain what degree of impact will be given to opposing characters by ascertaining the length of the gauge bar representing state of character anger.

As described above, with this embodiment, icons are represented on the action-responsive gauge by designs corresponding to the action-responsive parameter, so the user can be directly aware, by viewing the icon, which action-responsive parameter the action-responsive gauge that is being displayed corresponds to. As a result, even in the case of an ice hockey game, in which the action of the characters is fast, the values of the action-responsive parameters that change in response to character action can be precisely grasped, making it possible to enjoy an ice hockey game with fast character action.

It would also be possible to display a gauge bar with a color corresponding to the respective action-responsive parameter. If this is done, it is possible to be directly aware which action-responsive parameter the action-responsive gauge that is being displayed corresponds to. For example, if the gauge bar representing degree of impact onto a character produced by checking is represented in red, the gauge bar representing speed of the puck after shooting is represented in yellow and the gauge bar representing skating speed is represented in blue, the type of action-responsive gauge that is currently being displayed can be identified by ascertaining these colors.

Figure 4:
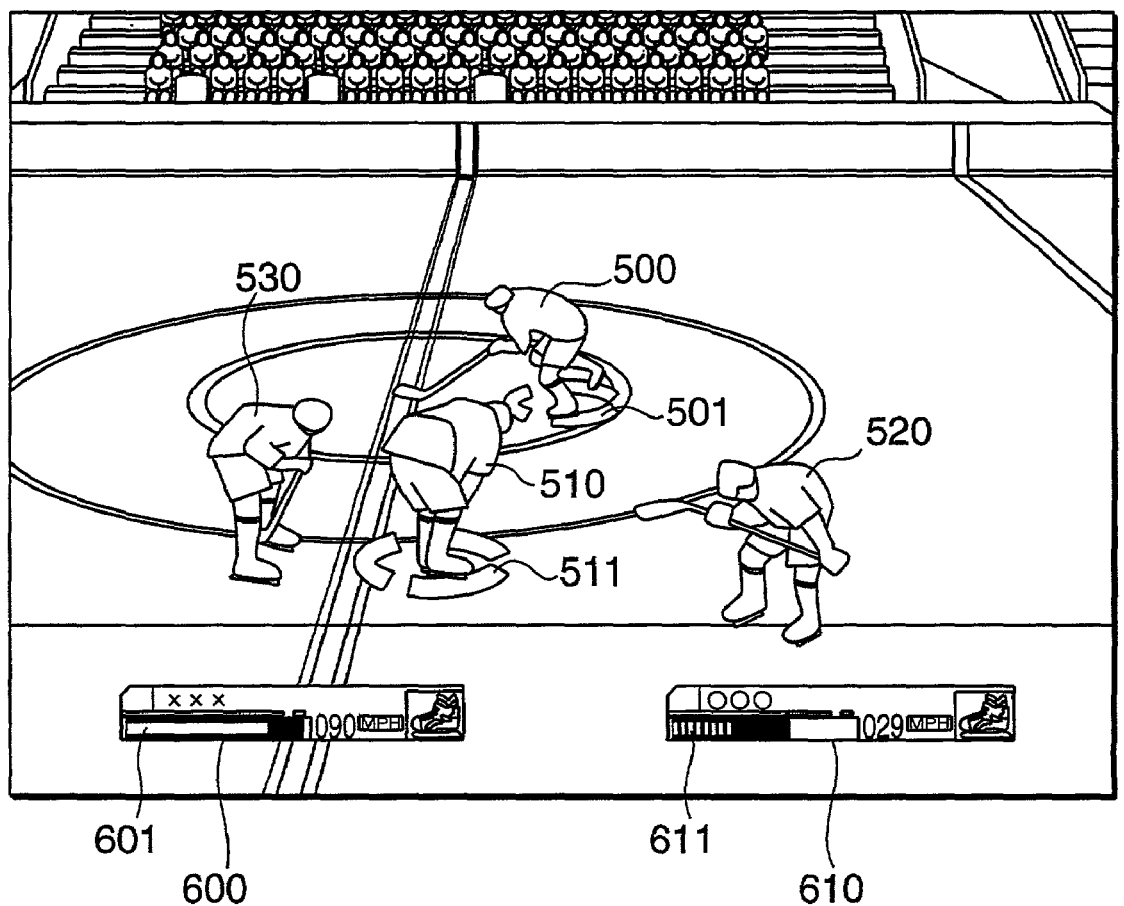
FIG. 4 is a view illustrating an example of a game screen displayed by the video game device shown in FIG. 2.

FIG. 4 is a view illustrating an example of a game screen displayed by the video game device illustrated in FIG. 2.

The characters 500, 510, 520, 530 shown in FIG. 4 are the respective ice hockey players used in the ice hockey game. Characters 500, 510 are the characters that can be controlled by the user while characters 520, 530 are characters controlled by the computer.

Cursors 501, 511 are cursors indicating characters that are currently controlled by different users. Each of these cursors is therefore displayed with a different color: for example, cursor 501 is displayed in red and cursor 511 is displayed in blue. Although, in the example illustrated in FIG. 4, character 500 and character 510 are displayed as characters in the same team so that different characters in the same team are operated by the two users, as a rule, the users, or the user and the computer, would compete by operating characters of respectively different teams.

It is also possible for a user to move the cursor to another character in the team by operating a prescribed button assigned to controller 19.

Action-responsive gauge 600 is an action-responsive gauge that is displayed when the action of character 500 is performing skating. Action-responsive gauge 610 is an action-responsive gauge that is displayed when the action of character 510 is performing skating. In the examples shown in FIG. 4, characters 500 and 510 are both set to player display type A, so action-responsive gauges 600, 610 display the skating speed of characters 500 and 510.

Specifically, if character 500 is skating at a speed of 90 MPH, gauge bar 601 of length corresponding to this numerical value is displayed. Also, if character 510 is skating with a speed of 29 MPH, gauge bar 611 of length corresponding to this numerical value is displayed.

Figure 5:
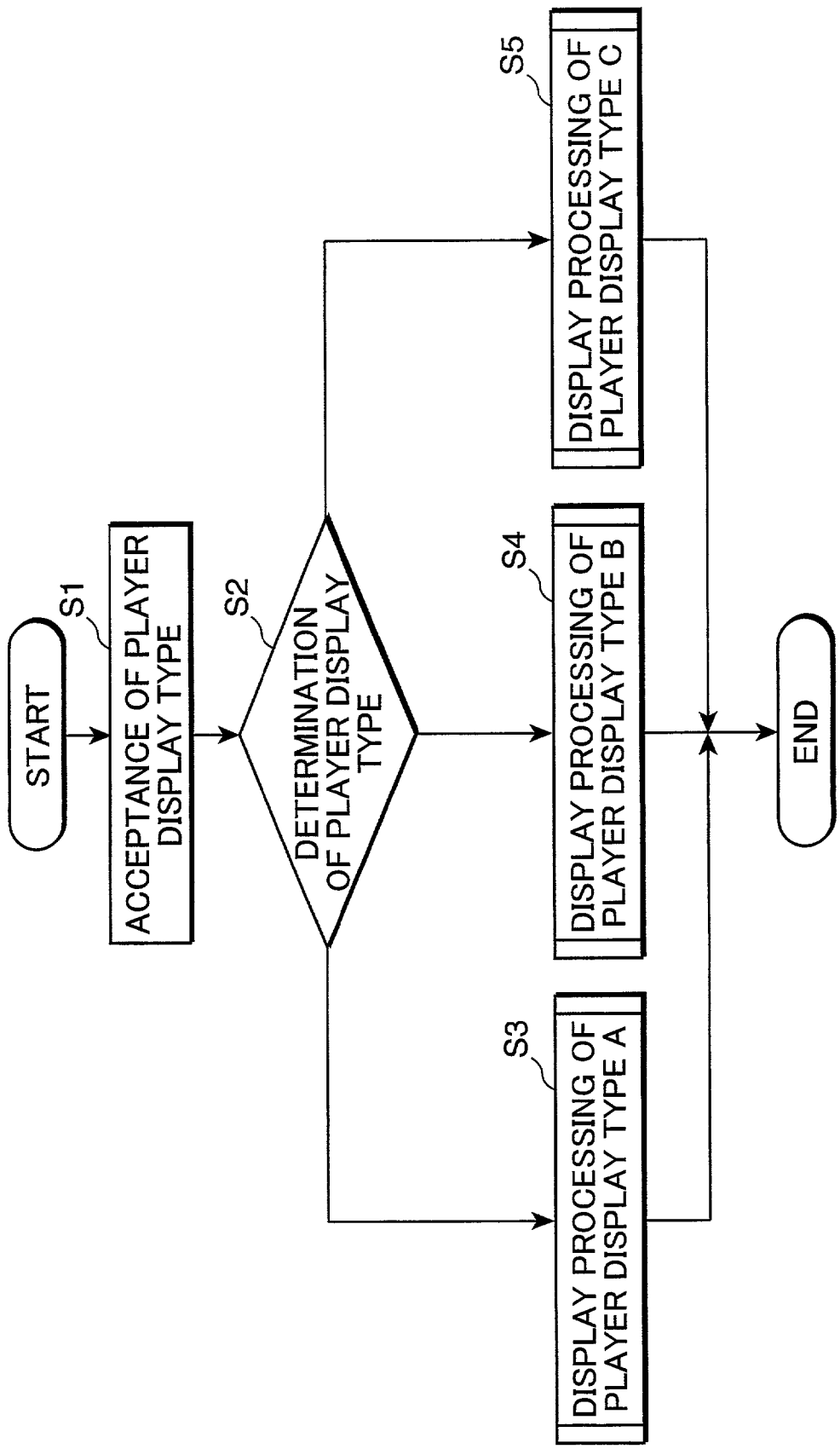
FIG. 5 is a flow chart illustrating gauge display processing performed by the video game device shown in FIG. 2.

FIG. 5 is a flow chart showing gauge display processing performed by the video game device shown in FIG. 2. The gauge display processing shown in FIG. 5 is processing that is performed by CPU 1 by reading and executing the gauge display program stored on recording medium 300.

First of all, in step S1, gauge display type acceptance section 101 accepts the player display type selected as a gauge display type from player display types A to C by the user by operating controller 19, and stores this in option data memory 51.

Next, in step S2, gauge display type determination section 102 reads the information relating to the gauge display type from option data memory 51 and determines which player display type corresponding to the action-responsive gauge that is to be displayed is to be set for the character.

Thereupon, if it is determined that the gauge display type is player display type A, processing advances to step S3 and the gauge display processing of player display type A is performed; if it is determined that the gauge display type is player display type B, processing advances to step S4 and the gauge display processing of player display type B is performed; if it is determined that the gauge display type is player display type C, processing advances to step S5 and the gauge display processing of player display type C is performed. After the gauge display processing of one other of the player display types has been completed, gauge display processing is terminated.

Figure 6:
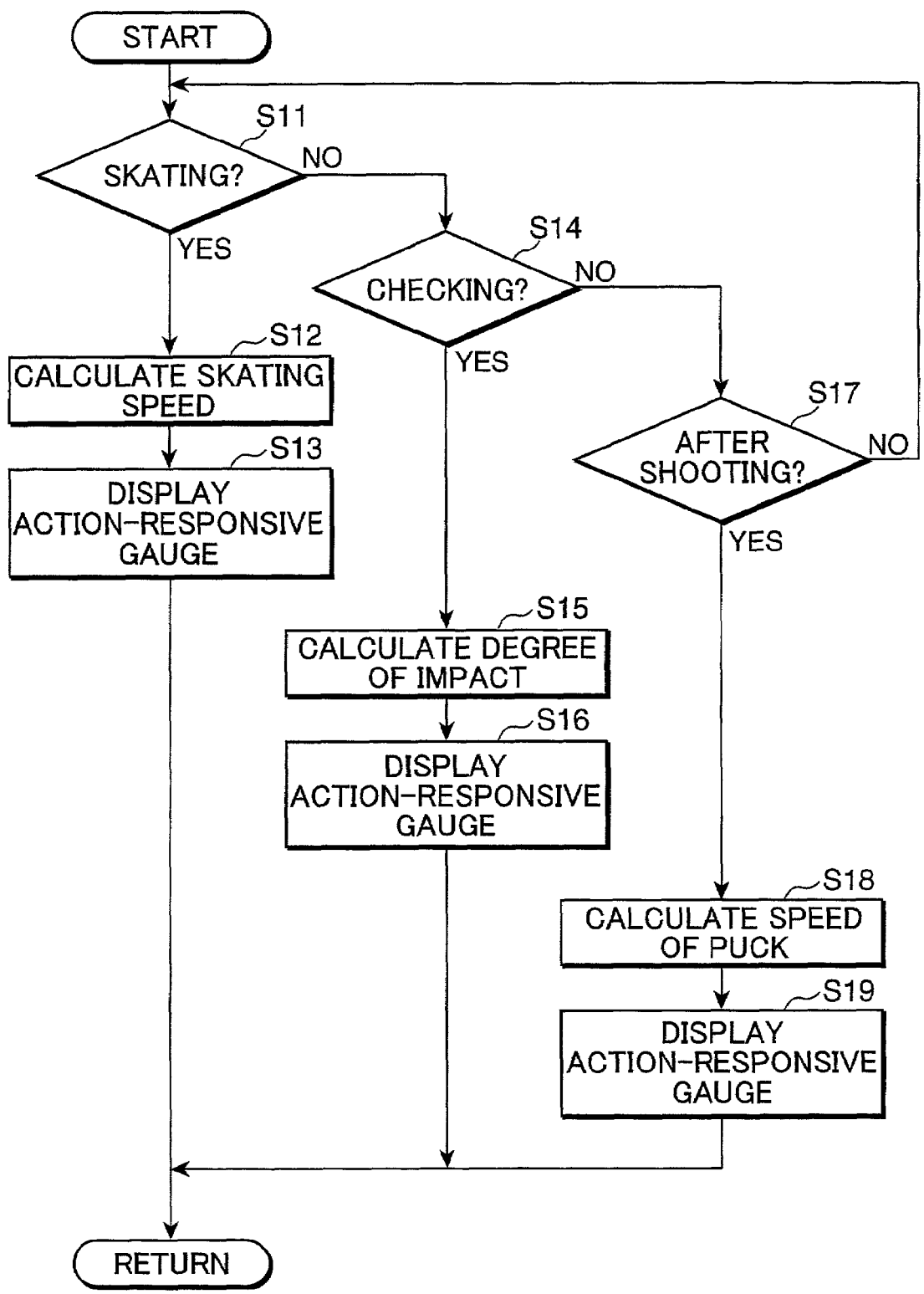
FIG. 6 is a flow chart illustrating gauge display processing of player display type A illustrated in FIG. 5.

FIG. 6 is a flow chart showing the gauge display processing of player display type A shown in FIG. 5.

In step S2 shown in FIG. 5, if it is determined that the gauge display type is player display type A, in step S11, action determination section 103 determines whether or not the character action corresponding to the action-responsive gauge that is to be displayed is "skating"; if the character action is "skating", processing advances to step S12; if the character action is not "skating", processing advances to step S14.

If the character action is "skating", in step S12, speed calculation section 104 calculates the skating speed of the character in terms of speed per hour. Next, in step S13, gauge display switching section 109 causes the action-responsive gauge that displays the calculated skating speed to be displayed on television monitor 21.

On the other hand, if the character action is not "skating", in step S14, action determination section 103 determines whether or not the character action corresponding to the action-responsive gauge that is to be displayed is "checking"; if the character action is "checking", control advances to step S15; if the character action is not "checking", control advances to step S17.

If the character action is "checking", in step S15, degree of impact calculation section 105 calculates the degree of impact of the character produced by the checking. Next, in step S16, gauge display switching section 109 causes the action-responsive gauge that displays the calculated degree of impact to be displayed on television monitor 21.

On the other hand, if the character action is not "checking", in step S17, action determination section 103 determines whether or not the character action corresponding to the action-responsive gauge that is to be displayed is "after shooting"; if the character action is "after shooting", control advances to step S18; if the character action is not "after shooting", control returns to step S11 and the subsequent processing is continued.

If the character action is "after shooting", in step S18, shooting speed calculation section 106 calculates the speed of the puck that has thus been shot. Next, in step S19, gauge display switching section 109 causes television monitor 21 to display the action-responsive gauge that displays the calculated puck speed.

Figure 7:
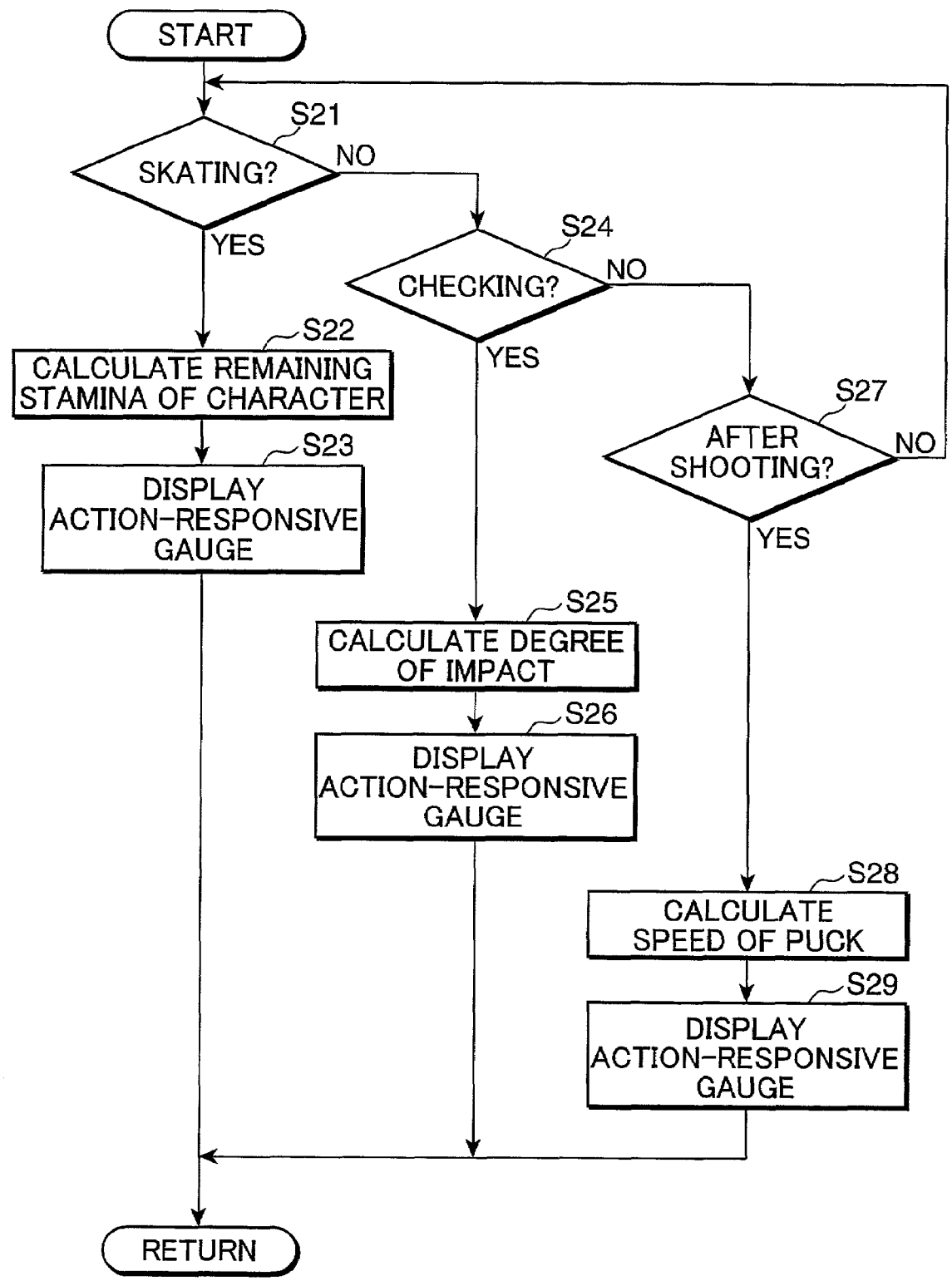
FIG. 7 is a flow chart illustrating gauge display processing of player display type B illustrated in FIG. 5.

FIG. 7 is a flow chart illustrating the gauge display processing of player display type B shown in FIG. 5. The processing of steps S21, S24 to S29 shown in FIG. 7 is identical with the processing of steps S11, S14 to S19 shown in FIG. 6, so further description thereof is omitted and hereinbelow only the different processing is described in detail.

If in step S21 it is determined that the character action is "skating", in step S22, remaining stamina calculation section 107 calculates the remaining stamina of the character. Next, in step S23, gauge display switching section 109 causes television monitor 21 to display the action-responsive gauge that displays the calculated remaining stamina.

Figure 8:
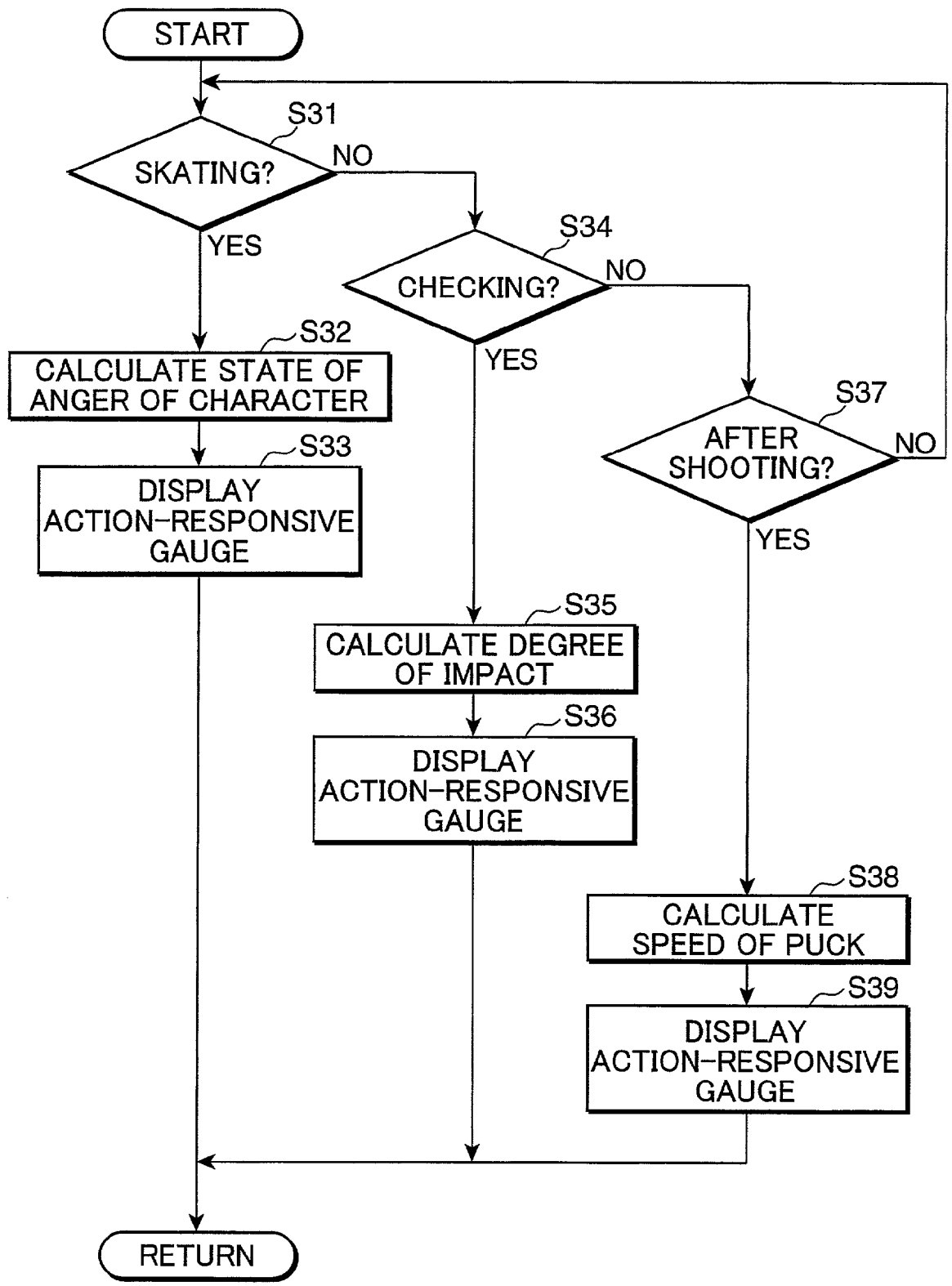
FIG. 8 is a flow chart illustrating gauge display processing of player display type C illustrated in FIG. 5.

FIG. 8 is a flow chart showing the gauge display processing of player display type C shown in FIG. 5. The processing of steps S31, S34 to S39 shown in FIG. 8 is identical with the processing of steps S11, S14 to S19 shown in FIG. 6, so further description is omitted and only the different processing is described in detail below.

If in step S31 it is determined that the character action is "skating", in step S22, anger calculation section 108 calculates the state of anger of the character. Next, in step S23, gauge display switching section 109 causes television monitor 21 to display the action-responsive gauge that displays the calculated state of anger.

By means of the above gauge display processing, in this embodiment, an action-responsive gauge to be displayed is selected from a plurality of action-responsive gauges in accordance with the character action, and display is effected with the action-responsive gauge that is displayed being successively switched over to the selected action-responsive gauge. Consequently, since the action-responsive gauge is automatically altered in accordance with the character action, the need for the user to perform the troublesome operation of changing over the action-responsive gauge in accordance with the character action is eliminated. As a result, the user can ascertain the values of suitable action-responsive parameters that are required, in accordance with character actions that have a considerable effect on the progress of the ice hockey game, so the user can easily ascertain the values of the action-responsive parameters and so play the ice hockey game advantageously.

In addition, since switching of the action-responsive gauge that is displayed is effected from among a plurality of action-responsive gauges, compared with the case where the plurality of action-responsive gauges are all displayed, the portion of the game screen that is occupied in order to display the action-responsive gauges can be reduced, so the image of the ice hockey game itself can be displayed satisfactorily as shown in FIG. 4.

Furthermore, since a player display type selected by the user from three kinds of player display types A to C whereby different combinations of action-responsive gauges can be displayed is accepted and an action-responsive gauge that effects display in accordance with the action of the character is selected from the action-responsive gauges capable of being displayed by the accepted player display type, the action-responsive gauge can be altered in accordance with character action and, in addition, the action-responsive gauge can be altered in accordance with player display types A to C. As a result, the kinds of action-responsive gauges capable of being displayed can be increased, so the values of more types of parameters can be ascertained.

It should be noted that the gauges employed in the present invention are not particularly restricted to the action-responsive gauges described above and other gauges could be displayed so long as they are gauges displayed in response to the condition of progress of the game. Also the parameters that are displayed by the gauges are not particularly restricted to the above action-responsive parameters and other parameters could be employed which are not associated with character actions employed in the game space. Also, as the gauges displayed on the game screen, it could be arranged to display two or more gauges from a plurality of gauges.

Also, the video games to which the present invention may be applied are not particularly restricted to ice hockey as mentioned above and the invention could be suitably applied to sports games with fast character action such as soccer games or basketball games and could also be applied to other video games such as combat games, simulation games, shooting games or role-playing games.

In summary, the present invention relates to a recording medium which stores a gauge display program for displaying a gauge representing a value of a parameter relating to a game character on a game screen: said program comprising the steps of: causing a video game device to select a gauge to be displayed on the game screen from a plurality of gauges that represents the values of a plurality of mutually different parameters, in accordance with the state of progress of the game; and causing the video game device to switch a display of the gauge displayed on the game screen to the gauge selected in said selection step.

With the aforementioned invention, a gauge display program for displaying a gauge representing the value of a parameter relating to a game character on a game screen causes the video game device to function as selection means that selects from a plurality of gauges that display the values of a plurality of mutually different parameters a gauge to be displayed on a game screen in accordance with the state of progress of the game and display switching means that successively switches the gauge displayed on the game screen to the gauge selected by the selection means. That is, in the video game, the gauge to be displayed on the game screen is selected from a plurality of gauges in accordance with the state of progress of the game and the gauge that is displayed is successively switched over to the selected gauge. Consequently, since the gauge is automatically altered in accordance with the state of progress of the game, the user can easily ascertain the values of parameters relating to the game character in accordance with the state of progress of the game without performing the troublesome operation of changing over gauge in response to the state of progress of the game.

Also, since the gauge to be displayed on the game screen is selected from a plurality of gauges and display is effected on the game screen with the selected gauge successively switched over, compared with the case where a plurality of gauges are all simultaneously displayed on the game screen, the region of the game screen occupied for displaying gauges can be reduced. Consequently, the image of the game itself can be satisfactorily displayed on the game screen. Accordingly, the user can ascertain the values of suitable parameters needed by the user in accordance with the state of progress of the game without performing the troublesome operation of changing over the gauge representing the value of the parameter related to the game character in accordance with the state of progress of the game, so the user can easily ascertain the value of the parameters and the region of the game screen occupied in order to display gauges can be reduced and, the image of the video game itself can therefore be satisfactorily displayed. Since the image of the game itself is displayed on the game screen, the interest of the game itself can be satisfactorily presented to the user.

In addition, in the recording medium defined in the above, said parameters may include a plurality of action-responsive parameters associated with actions of the game character; said gauges may include a plurality of action-responsive gauges that represent the values of said plurality of action-responsive parameters; and said selection means may select an action-responsive gauge to be displayed on the game screen, from the plurality of action-responsive gauges, in accordance with the action of the game character.

With the features described in the above, the parameters relating to a game character include a plurality of action-responsive parameters associated with game character action, the gauges representing the values of the parameters include a plurality of action-responsive gauges that represent the values of the plurality of action-responsive parameters and the selection means that selects the gauge displayed on the game screen selects from the plurality of action-responsive gauges an action-responsive gauge to be displayed on the game screen, in accordance with game character action.

Specifically, the action-responsive gauge to be displayed on the game screen is selected from a plurality of different action-responsive gauges in response to game character action, and the action-responsive gauge that is displayed on the game screen is displayed with switching being successively effected to the selected action-responsive gauge. Consequently, since display on the game screen is effected with automatic alteration to a suitable action-responsive gauge required by the user in response to game character action, the user can accurately ascertain the value of a suitable action-responsive parameter required by the user in response to game character action which has a large effect on game progress, without needing to perform the troublesome operation of changing over action-responsive gauge in response to game character action.

Also, since the action-responsive gauge to be displayed on the game screen is switched over from a plurality of action-responsive gauges, compared with the case where a plurality of action-responsive gauges are all simultaneously displayed on the game screen, the region of the game screen occupied for displaying action-responsive gauges can be reduced. Accordingly, in addition to the benefits of the invention previously mentioned, the user can ascertain the value of a suitable action-responsive parameter needed by the user in accordance with character action that has a large effect on the progress of the game without performing the troublesome operation of changing over an action-responsive gauge in response to character action, so the user can play the game advantageously by being able to easily ascertain the value of the action-responsive parameter and the region of the game screen occupied in order to display the action-responsive gauge can be reduced, with the result that the image of the video game itself can be satisfactorily displayed.

In the recording medium as defined, said program may further comprise the step of causing said video game device to accept a gauge display type selected by the user from a plurality of gauge display types of different combinations of action-responsive gauges that can be displayed on the game screen; and said selection means selects an action-responsive gauge to be displayed on the game screen, from action-responsive gauges that can be displayed on the game screen, in response to the action of the game character in accordance with the accepted gauge display type.

With the above described features, the gauge display program causes the video game device to function as acceptance means that accepts a gauge display type selected by the user from a plurality of gauge display types of different combinations of action-responsive gauge capable of being displayed on the game screen and the selection means that selects the gauge to be displayed on the game screen selects from action-responsive gauges capable of being displayed on the game screen an action-responsive gauge to be displayed on the game screen in response to game character action in accordance with the gauge display type accepted by the acceptance means.

Specifically, the gauge display type that is selected by the user from a plurality of gauge display types of different combinations of action-responsive gauge capable of being displayed simultaneously on the game screen is accepted, and the action-responsive gauge that is to be displayed is selected in accordance with game character action from a plurality of action-responsive gauges capable of being displayed by the accepted gauge display type, and the action-responsive gauge that is displayed is displayed with switching being successively effected to the selected action-responsive gauge.

In this way, since the gauge display type can be altered in response to user selection, it is possible not merely to alter the action-responsive gauge in response to game character action but also to alter the action-responsive gauge in response to gauge display type. Accordingly, in addition to the benefits of the invention described previously, the action-responsive gauge can be altered in response to game character action and in addition the action-responsive gauge can be altered in response to the gauge display type, so the types of action-responsive gauge that can be displayed can be increased, making it possible to ascertain easily the values of action-responsive parameters of more types.

Furthermore, in the recording medium as defined in the above, said action-responsive gauge may be set to represent a limit value of said action-responsive parameter, and said limit value of the action-responsive parameter can be set for each game character.

With the present invention according to claim 4, since the limit values of the action-responsive parameter are set for each game character and may be different depending on the game character, some game characters will have a larger limit value of the action-responsive parameter set whereas other game characters will have a smaller limit value of the action-responsive parameter set; in this way, the progress of the video game can be diversified by means of the difference of limit values of such action-responsive parameters. Accordingly, in addition to the benefits of the invention described in the above, the progress of the video game can be diversified by means of the difference of the limit values of action-responsive parameters so the interest of the video game can be further improved.

Moreover, in the recording medium, an icon corresponding to said action-responsive parameter may be displayed on said action-responsive gauge.

With the above feature, since an icon corresponding to the action-responsive parameter is displayed on the action-responsive gauge, by viewing the icon displayed on the action-responsive gauge, the user can be directly aware which action-responsive parameter the action-responsive gauge that is being displayed corresponds to. As a result, for example in the case of a video game with a sports theme in which the action of the game characters is fast, the values of the action-responsive parameters that change in response to game character action can be precisely grasped.

Accordingly, in addition to the benefits of the invention described in the above, even in the case of a video game with fast action of the game characters, it is possible for the user to accurately grasp the values of action-responsive parameters that change in response to game character action so a video game with fast game character action can be satisfactorily enjoyed.

The another aspect of the present invention relates to a gauge display method for displaying on a game screen a gauge representing the value of a parameter relating to a game character, wherein said display method comprising the steps of: selecting a gauge to be displayed on the game screen from a plurality of gauges that represent the values of a plurality of mutually different parameters in accordance with the state of progress of the game; and switching the gauge displayed on the game screen successively to the gauge selected in said selecting step.

With the another aspect of the present invention as defined in the above, a gauge display method of displaying on a game screen a gauge representing the value of a parameter relating to a game character includes a first step of selecting a gauge from a plurality of gauges that display the values of a plurality of mutually different parameters whereby display is effected on the game screen in accordance with the state of progress of the game and a second step wherein the gauge that is displayed on the game screen is successively switched over to a gauge selected by the selection means. Specifically, in the video game, the gauge that is to be displayed on the game screen is selected from a plurality of gauges in accordance with the state of progress of the game and the gauge displayed is successively switched over to the selected gauge. Consequently, since the gauge is automatically altered in response to the state of progress of the game, the user can easily ascertain the parameter value relating to the game character in accordance with the state of progress of the game without performing the troublesome operation of changing over the game screen in response to the state of progress of the game.

Also, since the gauge to be displayed on the game screen is switched over from a plurality of gauges, compared with the case where a plurality of gauges are all displayed, the region of the game screen occupied for displaying gauges can be reduced. Accordingly, the values of suitable parameters required by the user in accordance with the state of progress of the game can be accurately ascertained by the user without performing the troublesome operation of changing over a gauge displaying the parameter value relating to the game character in accordance with the state of progress of the game so the user can easily ascertain the parameter value and the region of the game screen occupied in order to display gauges can be reduced; as a result, the image of the video game itself can be satisfactorily displayed. Since the image of the game itself is displayed on the game screen, the interest of the game itself can be satisfactorily presented to the user.

In addition, another aspect of the present invention relates to a video game device that displays on the game screen a gauge representing the value of a parameter relating to a game character, wherein said video game device comprising: selection means that selects a gauge to be displayed on a game screen, from a plurality of gauges that represent the values of a plurality of mutually different parameters, in accordance with the state of progress of the game; and display switching means that switches the gauge displayed on the game screen to the gauge selected by said selection means. Consequently, since the gauge is automatically altered in accordance with the state of progress of the game, the user can easily ascertain the value of a parameter relating to a game character in accordance with the state of progress of the game without performing the troublesome operation of changing over the gauge in response to the state of progress of the game. Accordingly, the values of suitable parameters required by the user in accordance with the state of progress of the game can be ascertained by the user without performing the troublesome operation of changing over a gauge displaying the parameter value relating to the game character in accordance with the state of progress of the game so the user can easily ascertain the parameter value and the region of the game screen occupied in order to display gauges can be reduced; as a result, the image of the video game itself can be satisfactorily displayed. Since the image of the game itself is displayed on the game screen, the interest of the game itself can be satisfactorily presented to the user.

In addition, since the gauge that is displayed on the game screen is switched over from among a plurality of gauges, compared with the case where all of the plurality of gauges are simultaneously displayed on the game screen, the region of the game screen occupied for displaying gauges can be reduced.

This application is based on Japanese patent application serial no. 2001-147130, filed in Japan Patent Office on May 16, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A computer readable recording medium which stores computer executable gauge display program, said program comprising the steps of:

defining action-responsive gauges of various action types corresponding to predetermined actions of a game character, the action-responsive gauges being grouped in parameter display type subsets each including one of the action-responsive gauges for each of the predetermined actions, the action-responsive gauges of each of the parameter display type subsets displaying a set of mutually different parameters of the same character associated with each of the predetermined actions, and the sets of mutually different parameters being mutually different from one another;

controlling the video game device to accept a user input choosing one of a plurality of display types each respectively corresponding to one of said display type subsets;

causing a video game device to select an action-responsive gauge to be displayed on a game screen from the action-responsive gauges of the parameter display type subset of the chosen display type in response to the game character being controlled to perform a respective one of said predetermined actions during progress of the game; and causing the video game device to switch a display of an action-responsive gauge displayed on the game screen to the action-responsive gauge selected in said selection step in response to the game character being controlled to perform the respective one of said predetermined actions.

2. A gauge display method for displaying on a game screen a gauge, said display method comprising the steps of:

providing means defining action-responsive gauges of various action types corresponding to predetermined actions of a game character, the action-responsive gauges being grouped in parameter display type subsets each including one of the action-responsive gauges for each of the predetermined actions, the action-responsive gauges of each of the parameter display type subsets displaying a set of mutually different parameters of the game character associated with each of the predetermined actions, and the sets of mutually different parameters being mutually different from one another;

accepting a user input, via user input means, for choosing one of a plurality of display types each respectively corresponding to one of said display type subsets;

selecting, via a selection means, a gauge to be displayed on the game screen from gauges that represent the values of a plurality of mutually different parameters in accordance with the state of progress of the game; and selecting an action-responsive gauge to be displayed on a game screen, corresponding to displayed predetermined actions of the game character, from the action-responsive gauges of the parameter display type subset of the chosen display type in response to the game character being controlled to perform a respective one of said predetermined actions during progress of the game; and switching an action-responsive gauge displayed on the game screen to the action-responsive gauge selected in said selecting step in response to the game character being controlled to perform the respective one of said predetermined actions.

3. A video game device that displays on a game screen a gauge, said video game device comprising:

means defining action-responsive gauges of various action types corresponding to predetermined actions of a game character, the action-responsive gauges being grouped in parameter display type subsets each including one of the action-responsive gauges for each of the predetermined actions, the action-responsive gauges of each of the parameter display type subsets displaying a set of mutually different parameters of the game character associated with each of the predetermined actions, and the sets of mutually different parameters being mutually different from one another;

user input means for accepting a user input choosing one of a plurality of display types each respectively corresponding to one of said display type subsets;

selection means that selects an action-responsive gauge to be displayed on a game screen, corresponding to displayed predetermined actions of the game character, from the action-responsive gauges of the parameter display type subset of the chosen display type in response to the game character being controlled to perform a respective one of said predetermined actions during progress of the game; and display switching means that switches an action-responsive gauge displayed on the game screen to the action-responsive gauge selected by said selection means in response to the game character being controlled to perform the respective one of said predetermined actions.

4. A computer readable recording medium which stores a computer executable gauge display program for a video game device, said program comprising the steps of:

defining action-responsive gauges representing mutually different parameters of a game character, the action-responsive gauges being of various action types corresponding to predetermined actions of a game character, said action types including at least a first action type corresponding a first predetermined action and a second action type corresponding to a second predetermined action, said first action type including at least first and second action-responsive gauges of said action-responsive gauges, and said second action type including at least a third action-responsive gauge of said action-responsive gauges;

accepting a user input selecting one of said at least first and second action-responsive gauges to be displayed in response to the game character being controlled to perform a corresponding first predetermined action of said predetermined actions;

selecting as a gauge to display the user selected one of said at least first and second action-responsive gauges in response to the game character being controlled to perform said first predetermined action;

selecting as a gauge to display said third action-responsive gauge in response to the game character being controlled to perform said second predetermined action; and causing the video game device to switch a display of a presently displayed action-responsive gauge displayed on the game screen to the gauge to display in response to the game character being controlled to perform one of said first and second predetermined actions.

5. The recording medium of claim 4, wherein said first predetermined action is skating and said second predetermined action is one of checking and shooting.

6. The recording medium of claim 5, wherein said at least first and second action-responsive gauges include three gauges respectively displaying speed, stamina and anger levels of the game character.

7. The recording medium of claim 6, wherein said second predetermined action is checking and said least a third action-responsive gauge displays an impact level.

8. The recording medium of claim 6, wherein said second predetermined action is shooting and said least a third action-responsive gauge displays a puck speed level.

9. A video game machine for playing a game wherein a gauge is displayed on a display, the game machine comprising:

means for defining action-responsive gauges representing mutually different parameters of a game character, the action-responsive gauges being of various action types corresponding to predetermined actions of a game character;

user selection means for selecting a desired gauge from a subset of said action-responsive gauges having an action type corresponding to a respective one of said predetermined actions;

means for selecting as a gauge to display one of said action-responsive gauges in response to the game character being controlled to perform a corresponding one of said predetermined actions corresponding to said gauge to display;

said means for selecting as the gauge to display said desired gauge in response to the game character being controlled to perform said respective one of said predetermined actions; and means for switching a display of a presently displayed action-responsive gauge displayed on the display to the gauge to display in response to the game character being controlled to perform said corresponding one of said predetermined actions.

* * * * *